US011875116B2

(12) United States Patent
Sar Shalom et al.

(10) Patent No.: US 11,875,116 B2
(45) Date of Patent: Jan. 16, 2024

(54) MACHINE LEARNING MODELS WITH IMPROVED SEMANTIC AWARENESS

(71) Applicant: Intuit Inc., Mountain View, CA (US)

(72) Inventors: Oren Sar Shalom, Nes Ziona (IL); Alexander Zhicharevich, Hod Hasharon (IL); Adi Shalev, Herzliya (IL); Yehezkel Shraga Resheff, Jerusalem (IL)

(73) Assignee: Intuit Inc., Mountain View, CA (US)

( * ) Notice: Subject to any disclaimer, the term of this patent is extended or adjusted under 35 U.S.C. 154(b) by 829 days.

(21) Appl. No.: 16/723,991

(22) Filed: Dec. 20, 2019

(65) Prior Publication Data
US 2021/0192136 A1 Jun. 24, 2021

(51) Int. Cl.
G06F 40/284 (2020.01)
G06F 40/289 (2020.01)
G06F 40/30 (2020.01)
G06N 3/08 (2023.01)
G06N 20/10 (2019.01)
(Continued)

(52) U.S. Cl.
CPC .......... *G06F 40/30* (2020.01); *G06F 16/3329* (2019.01); *G06F 16/3334* (2019.01); *G06F 16/3344* (2019.01); *G06F 40/289* (2020.01); *G06N 3/08* (2013.01); *G06N 20/10* (2019.01)

(58) Field of Classification Search
CPC ........ G06F 16/35; G06F 40/284; G06F 40/30; G06F 16/3329; G06F 6/3334; G06F 16/3344; G06F 16/95; G06N 3/0454; G06N 3/0445; G06N 3/08; G06N 3/0472; G06N 3/084; G06N 3/082
See application file for complete search history.

(56) References Cited

U.S. PATENT DOCUMENTS 10,817,527 B1\* 10/2020 Setlur .................. G06F 16/243
2016/0125028 A1\* 5/2016 Silvestri ............. G06F 16/3338
707/718
(Continued)

OTHER PUBLICATIONS

Huang et al., "Enhancing long short-term memory for text categorization", May 2019, arXiv preprint arXiv: 1905.11558. May 28, 2019.\*
(Continued)

*Primary Examiner* — Olujimi A Adesanya
(74) *Attorney, Agent, or Firm* — Ferguson Braswell Fraser Kubasta PC

(57) ABSTRACT

A method including inputting, into a phrase recognition model comprising a neural network, a vector comprising a plurality of ngrams of text. The method also includes applying, using the phrase recognition model, a filter to the plurality of ngrams during execution. The filter has a skip word setting of at least one. The method also includes determining, based on the skip word setting, at least one ngram in the vector to be skipped to form at least one skip word. The method also includes outputting an intermediate score for a set of ngrams that match the filter. The method also includes calculating a scalar number representing a semantic meaning of the at least one skip word. The method also includes generating based on the scalar number and the intermediate score, a final score for the set of ngrams. A computer action is performed using the final score.

19 Claims, 5 Drawing Sheets

(51) Int. Cl.
*G06F 16/33* (2019.01)
*G06F 16/332* (2019.01)

(56) References Cited

U.S. PATENT DOCUMENTS

| | | | | |
|---|---|---|---|---|
| 2016/0189218 | A1* | 6/2016 | Kota | G06Q 30/0256 705/14.54 |
| 2016/0247061 | A1* | 8/2016 | Trask | G06N 3/04 |
| 2018/0068183 | A1* | 3/2018 | Van Rotterdam | G06V 30/418 |
| 2018/0144234 | A1* | 5/2018 | Devesa | G06N 3/006 |
| 2018/0285344 | A1* | 10/2018 | He | G06F 40/30 |
| 2019/0095788 | A1* | 3/2019 | Yazdani | G06N 3/084 |
| 2019/0370273 | A1* | 12/2019 | Frison | G06F 16/338 |
| 2020/0073882 | A1* | 3/2020 | Guggilla | G06N 5/022 |
| 2020/0184339 | A1* | 6/2020 | Li | G06N 3/0454 |
| 2020/0311519 | A1* | 10/2020 | Fei | G06F 16/353 |
| 2020/0349179 | A1* | 11/2020 | Kong | G06F 16/316 |
| 2021/0073830 | A1* | 3/2021 | Morales | G06Q 30/0629 |

OTHER PUBLICATIONS

Liu et al., "Learning context-sensitive word embeddings with neural tensor skip-gram model", 2015, InTwenty-fourth international joint conference on artificial intelligence Jun. 24, 2015.*

Neelakantan et al. "Efficient non-parametric estimation of multiple embeddings per word in vector space", 2015, arXiv preprint arXiv: 1504.06654. Apr. 24, 2015.*

Nguyen, T. H., et al., "Modeling Skip-Grams for Event Detection with Convolutional Neural Networks", Proceedings of the 2016 Conference on Empirical Methods in Natural Language Processing, Austin, Texas, Nov. 1-5, 2016, 6 pages.

Lei, T., et al., "Molding CNNs for Text: Non-Linear, Non-Consecutive Convolutions", Aug. 18, 2015, 11 pages.

Schwartz, R., et al., "SoPa: Bridging CNNs, RNNs, and Weighted Finite-State Machines", ACL 2018, May 15, 2018, 12 pages.

Liu, Chaochun, et al. "Deep skip gram networks for text classification." Proceedings of the 2019 SIAM International Conference on Data Mining. Society for Industrial and Applied Mathematics, May 6, 2019, 9 pages.

* cited by examiner

MACHINE LEARNING MODELS WITH IMPROVED SEMANTIC AWARENESS

BACKGROUND

Machine learning may be used to model words and phrases input into a computer. The model may then be used to predict the meaning of the words and phrases, and even produce an automatic response.

For example, some so-called "chatbots" may be made to simulate computer-facilitated interaction with a human. A chatbot is software that, in part, uses a machine learning model to conduct a conversation with a human via auditory or textual methods. Machine learning models are also used for recommendation systems, such as to predict the entertainment event a user might like to watch or attend based on past user input.

However, current machine learning models struggle with an assortment of issues in terms of ascertaining the intended meaning of a human using natural human expressions. For example, certain words in a sentence may change the semantic meaning of a sentence, while in other cases the same semantic meaning may be conveyed using different phrases. Thus, even with machine learning, a computer often has difficulty in accurately determining the intent conveyed by natural human language.

SUMMARY

The one or more embodiments provide for a method. The method includes inputting, into a phrase recognition model including a neural network, a vector having ngrams of text. The method also includes applying, using the phrase recognition model, a filter to the ngrams during execution. The filter has a skip word setting of at least one. The method also includes determining, based on the skip word setting, at least one ngram in the vector to be skipped to form at least one skip word. The method also includes outputting an intermediate score for a set of ngrams of the ngrams that match the filter. The method also includes calculating a scalar number representing a semantic meaning of the at least one skip word. The method also includes generating based on the scalar number and the intermediate score, a final score for the set of ngrams. The method also includes performing a computer action using the final score.

The one or more embodiments also provide for a system. The system includes a data repository. The data repository stores a phrase recognition model including a convolutional neural network machine learning model. The data repository also stores a vector, including ngrams of text, configured for input into the phrase recognition model. The data repository also stores a filter defined for use by the convolutional neural network. The data repository also stores at least one skip word skipped by the convolutional neural network when comparing the vector to the filter. The data repository also stores an intermediate score for a set of matching ngrams in the ngrams. The intermediate score indicates a first prediction of a match between the vector and filter. The data repository also stores a skip word scalar engine. The data repository also stores a scalar number representing a semantic meaning of the skip word. The data repository also stores a final score for the set of matching ngrams. The system also includes a server configured to execute a server application and a response application. The server application includes instructions for executing the phrase recognition model by applying the filter with the skip word to the ngrams during execution. The server application also includes instructions for executing the phrase recognition model by determining at least one ngram in the vector to be skipped to form the at least one skip word. The server application also includes instructions for executing the phrase recognition model by outputting the intermediate score for the set of matching ngrams. The server application also includes instructions for executing the skip word scalar engine to compute the scalar number. The server application also includes a combination engine configured to combine the intermediate score and the scalar number to produce the final score. The server application also includes a prediction tool configured to predict a predicted computer action based on the final score. The response application is configured to perform the predicted computer action over a network with respect to a user device.

The one or more embodiments also provide for a method of training a phrase recognition model including a neural network. The method includes receiving training phrases for which corresponding known meanings are available. The method also includes converting the training phrases into a vector including ngrams of text. The method also includes inputting, into the phrase recognition model, the vector. The method also includes applying, using the phrase recognition model, a filter to the ngrams during execution. The filter includes a skip word setting of at least one. The method also includes determining, based on the skip word setting, at least one ngram in the vector to be skipped to form at least one skip word. The method also includes outputting an intermediate score for a set of ngrams of the ngrams that match the filter. The method also includes calculating a scalar number representing a semantic meaning of the at least one skip word. The method also includes generating based on the scalar number and the intermediate score, a final score for the set of ngrams. The method also includes comparing the final score to the known meanings to form a comparison. The method also includes modifying the phrase recognition model based on the comparison between the final score and the known meanings.

Other aspects of the invention will be apparent from the following description and the appended claims.

DETAILED DESCRIPTION

Figure 1:
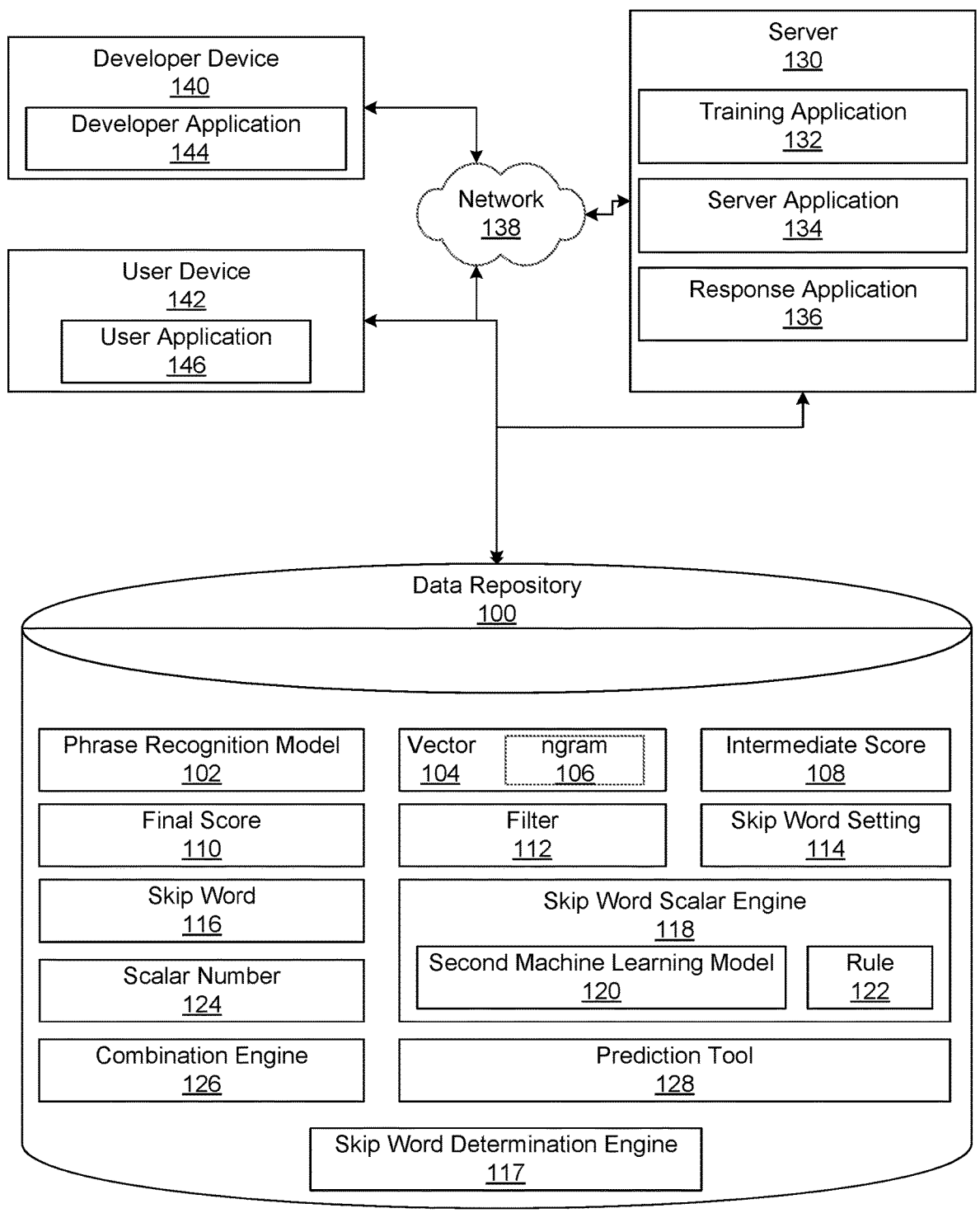
FIG. 1 shows a system diagram for an improved machine learning model, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to an improved machine learning model, which, in one example, may be a convolutional neural network (CNN). Specifically, one or more embodiments are directed to what may be termed a "magnitude aware skip CNN." More particularly, one or more embodiments improve CNN performance by determining a value representing the semantic meaning of a ngram skipped as a result of a skip setting applied to a filter defined for the CNN. The value (i.e., semantic meaning) of the skip word is applied to the initial prediction of the CNN, which thereby improves the final output of the CNN. As a result, improved predictions may be made using the improved CNN output. These improved predictions may be used by business, individuals, or anyone who needs accurate predictions to provide sound advice. Terms used above are defined with respect to the system shown in FIG. 1.

For reference, a convolutional neural network (CNN) is a deep learning architecture that may be used to create a distributed representation for a single text or compilation of texts. Specifically, a CNN may represent a text by a vector, which is a standard data structure that may be used by machine learning models. The input is a text of some variable length, where each ngram in the text is represented by some vector. The output is a single vector that represents the whole text of ngrams.

CNNs may contain multiple filters, each of which captures some patterns in the text. For instance, there could be a filter that captures phrases like "I love this movie". Each filter is composed of several slots, and each slot captures a single ngram. In one example, the filter is composed of 4 slots, the first captures ngrams that are similar to "I", the second captures similar to "love," and so forth. Additional information regarding the operation of CNNs, generally, may be found in Jacovi, et al., *Understanding Convolutional Neural Networks for Text Classification*, arXiv: 1809.08037v2 [cs.CL] 12 Aug. 2019.

One of the limitations of filters is filters can only model consecutive ngrams. Continuing the example, the filter may also capture phrases with close semantic meaning but with different wording, such as "We like that film". However, the filter will be useless for similar phrases with additional ngrams like "I really love this movie". This result occurs because a new ngram was introduced, and mixed the alignment between the sought pattern (the filter) and the given text.

The phenomenon of having close phrases but with a variable number of words is common in many languages. Thus, a very large number (thousands or tens of thousands or more) of filters may be used to capture many variants. This approach is not optimal, as the approach increases running time and memory, and is harder to converge into a desirable minimum.

Other techniques allow for skipping ngrams. Continuing the above example, the filter may skip the ngram "really". In this manner, the filter will be activated for that text. However, the skipped ngram is ignored, even if the skip word has semantic meaning. Therefore, phrase like "I really love this movie" and "I kind of love this movie" will be treated by the machine learning model as being equivalent, when a human would quickly recognize that the two phrases are not semantically equivalent.

One or more embodiments are directed to solving this technical problem present in current machine learning models, and particularly with respect to collaborative filtering CNNs. In particular, one or more embodiments provide techniques for programming a computer to capture the magnitude or effect a skipped ngram may have on an input phrase captured by a filter.

Attention is now turned to the figures. FIG. 1 shows a system diagram for leveraging an improved machine learning model, in accordance with one or more embodiments. The system shown in FIG. 1 may be used in a variety of applications in which a machine learning model is used to interpret natural language received from human input and/or make predictions based on the input.

In one or more embodiments, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may or may not be of the same type or located at the same physical site.

The data repository (100) may store a variety of information and/or program code used with respect to one or more embodiments. For example, the data repository (100) includes a phrase recognition model (102). The phrase recognition model (102) is a machine learning model. A machine learning model is a software application (or computer program) that has been trained to recognize certain types of patterns in input data. A machine learning model is trained using training data for which the expected outputs are known. Training the phrase recognition model (102) is described further below.

A variety of different kinds of machine learning models may be used for the phrase recognition model (102), particularly including different deep learning models. However, in one example embodiment, the phrase recognition model (102) may be a collaborative filtering convolutional neural network (CNN). As previously discussed, a CNN is a type of deep neural network. A deep learning neural network is a class that includes several different kinds of machine learning models. A CNN may also be referred-to as a shift invariant or space invariant artificial neural network, based on shared-weights architecture and translation invariance characteristics.

The phrase recognition model (102) takes data as input. The data may be in the form of a vector (104), which may be an array of data. For example, a vector may take the form of a one dimensional array of values (numbers). Each value represents one or more features. A feature is some type of data, and the value of the feature represents the instance of the data type. For example, the feature may be "cat" and the value of "1" indicates that a "cat" is present in some manner with respect to the data set, whereas the value of "0" indicates that a "cat" is not present in some manner with respect to the data set. In another example, the features may be words, letters, or a ngram (106). An "ngram" (106), as used herein, is string of alphanumeric text with possible special characters. For example, the string "alphadog123#" is a ngram (106), as is the phrase "solar".

The phrase recognition model (102), when executed using the input vector (104), produces an output, such as intermediate score (108). The output may be a value which reflects a pattern found in the data contained in the vector (104). The term "intermediate" is used because, in the procedure described with respect to FIG. 4, the initial prediction output by the phrase recognition model (102) is modified to produce a final score (110).

The final score (110) may be the ultimate output of the phrase recognition model (102), but also may be determined by some other machine learning model and/or set of rules which take as input the intermediate score (108). In any case, the intermediate score (108) is ultimately one or more numbers which reflects an output of the phrase recognition model (102) that indicates a pattern match in data contained in the vector (104). Similarly, the final score (110) is ultimately one or more numbers which reflects a modification to the intermediate score (108) to more accurately assess the semantic meaning of the pattern match found in the data contained in the vector (104).

In one embodiment, as indicated above, the phrase recognition model (102) is a CNN. A CNN may use a filter (112) as part of the programming of the phrase recognition model (102). A "filter" (112), as used herein, is a pre-defined ngram or set of ngrams. The CNN is programmed to identify specific ngrams or sets of ngrams in the vector (104). A CNN may have many filters, perhaps thousands of filters or more.

For example, a filter may be "I Love Solar Wind." In this case, the CNN would compare the ngrams (106) in the vector (104) to this filter. If the input matched the filter (112), then the CNN (i.e., the phrase recognition model (102)) may output an intermediate score (108) which then is used to predict that the user prefers to watch movies about astronomy.

However, given the word variance in how humans actually communicate, and further given that a human may communicate substantially the same intent with many different, possibly similar, word combinations, too many filters may be established for the CNN to process in an acceptable time period. To mitigate this issue, CNN filters may be assigned a skip word setting (114) so that more actual human phrases match a given filter.

A "skip word" (116), as used herein, refers to a ngram (106) that the CNN ignores or skips when comparing the filter (112) to the vector (104). In turn, a "skip word setting" (114), as used herein, refers to the number of skip words that may be ignored or skipped for any one filter. The skip word setting (114) may also be entered as a hyperparameter into the phrase recognition model (102) or some other machine learning model.

A skip word determination engine (117) performs the automatic determination of which ngrams (106) in the vector (104) are the skip words. In an embodiment, the skip word determination engine (117) is the phrase recognition model (102), or is part of the phrase recognition model (102). However, the skip word determination engine (117) may also be a different set of rules or a different machine learning model which communicates with the phrase recognition model (102). The skip word determination engine (117) may be implemented using dynamic programming in a manner described with respect to the method of FIG. 4.

Note that, when finding matching ngram sequences, the skip word determination engine (117) is not required to skip a ngram if the skip word setting is 1 or higher. Instead, the skip word determination engine (117) is programmed to find possible variations of the ngrams in the vector (104), while maintaining the order of the ngrams, and determine if a match can be found between any of the combinations of ngrams and the filter. A particular combination of the ngrams in the vector (104) is a defined "window." Stated differently, a window is a sequence of ngrams (e.g., words) within the vector (104) that are in the same order as the original vector (104), but where some of the ngrams (106) from the original vector (104) have been skipped.

The higher the value of the skip word setting (114) for a given filter (112), the more likely that a CNN identifies a match between the vector (104) and the filter (112). Thus, use of the skip word setting (114) may reduce the total number of filters, such as filter (112), used for natural language processing by the phrase recognition model (102).

However, a programmer should be careful, because if the skip word setting (114) is too high, then the entire meaning of a phrase may be missed or even completely misinterpreted. In the above example, had the skip word setting (114) been "4", then both the phrase "I Really Love Gone With The Solar Wind" and "I Really Do Not Love Gone With The Solar Wind" would both match the filter (112). Depending on the desired prediction by the programmer, such an overlap in matching could result in a wrong prediction because a human can instantly assess that the two phrases have opposite semantic meanings.

The one or more embodiments recognize that the skip word (116) is ignored by conventional CNNs when comparing the vector (104) to the filter (112). However, the skip word (116) may carry semantic meaning which alters the semantic interpretation of the vector (104). A conventional CNN effectively loses or discards the semantic meaning carried by the skip word (116) "really."

Figure 4:
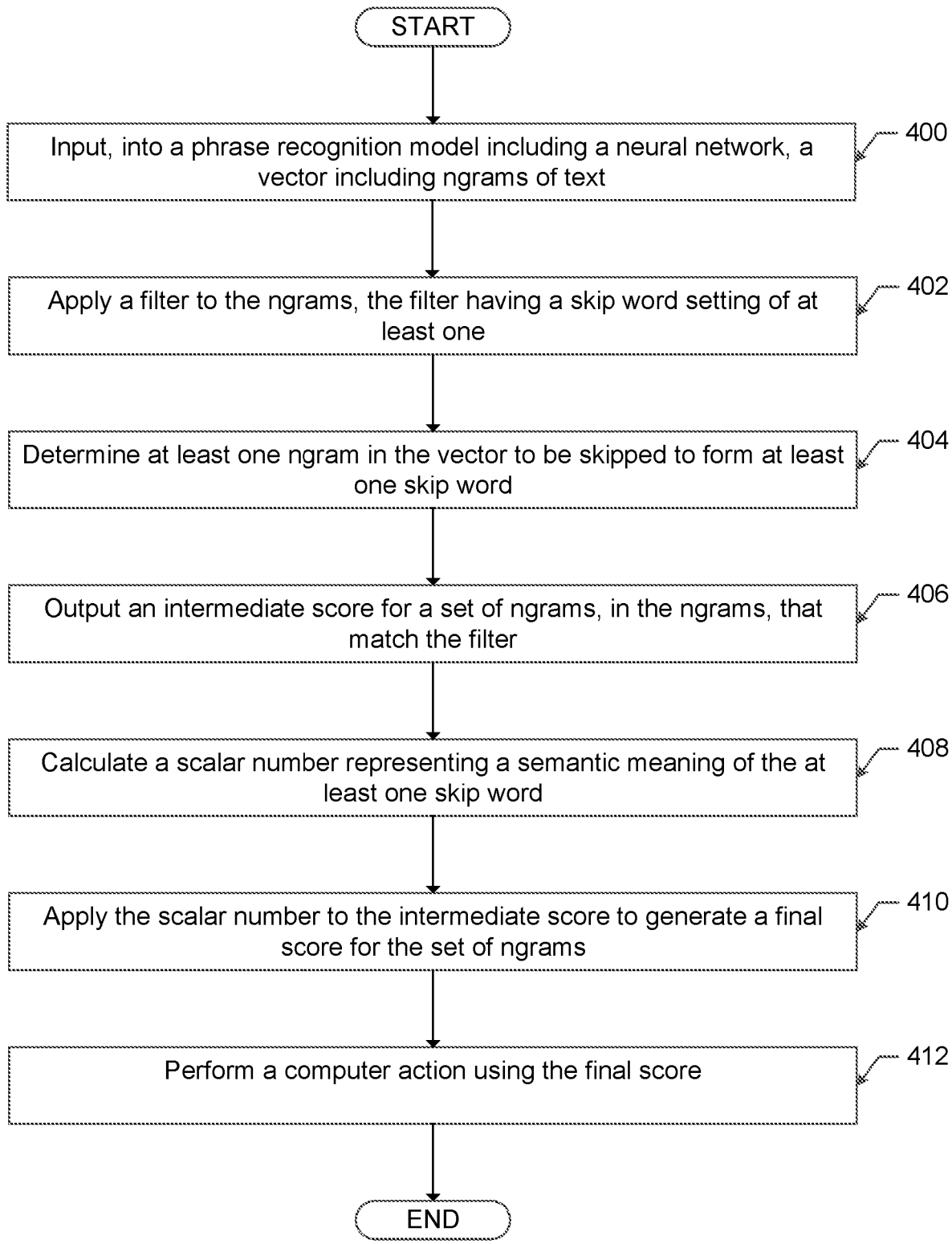
FIG. 4 shows a method for using an improved, semantically aware convolutional neural network, in accordance with one or more embodiments.

Thus, the system of FIG. 1, using the procedures described with respect to FIG. 4, programs or improves the phrase recognition model (102) to incorporate the semantic meaning carried by the skip word (116). Stated differently, one or more embodiments represent an improved phrase recognition model (102) and an improvement to the computer's ability to interpret the semantic meaning of input provided in the vector (104).

Continuing with FIG. 1, the data repository (100) may also store a skip word scalar engine (118). The skip word scalar engine (118) is programmed to determine the semantic meaning of the skip word (116) when the phrase recognition model (102) finds a match between the vector (104) and the filter (112). The skip word scalar engine (118) may be the phrase recognition model (102) in one embodiment. Stated differently, part of the programming of the phrase recognition model (102) may be to also serve as the skip word scalar engine (118).

The skip word scalar engine (118) may also be another machine learning model, different than the phrase recognition model (102), such as second machine learning model (120). The second machine learning model (120) may also be a CNN in a specific embodiment, but could be any deep learning network different than the phrase recognition model (102). The second machine learning model (120) may also be a recurrent neutral network (RNN). The skip word scalar engine (118) could also be a program which matches a given ngram (106) with a number which reflects the semantic meaning of the ngram (106). In this case, the skip word scalar engine (118) may use rules, such as rule (122), to assign a given skip word (116) a scalar number (124). Thus, the output of the skip word scalar engine (118) is a scalar number (124). The scalar number (124) reflects the semantic meaning of the skip word (116). For example, the ngram "really," in the above example, may be a positive number to indicate a reinforcement of the semantic meaning of the filter (112).

Note that the skip word (116) may instead be phrase. As used herein, in one or more embodiments, a phrase is two or more ngrams considered together. Also, the term "skip word" automatically contemplates either a phrase or a single ngram. Thus, for example, the skip word (116) could be "do not." In this case, the skip word scalar engine (118) may compute a scalar number (124) that is negative to indicate an inversion or reduction of the semantic meaning of the filter (112). For example, the phrase "do not" combined with "love" means that the original semantic meaning of "love" is inverted to some level of opposite meaning, such as "dislike," "hate," etc.

The data repository (100) may also store a combination engine (126). The combination engine (126) is program code used to combine the intermediate score (108) with the scalar number (124). The combination engine (126) could be a third machine learning model in some embodiments. In any case, the combination engine (126) may multiply, divide, add, subtract, or perform some other mathematical operation on the intermediate score (108) using the scalar number (124). Thus, the input of the combination engine (126) is the intermediate score (108) and the scalar number (124), and the output of the combination engine (126) is the final score (110).

Continuing with FIG. 1, the final score (110) may also store a prediction tool (128). The prediction tool (128) is program code which is programmed to take as input the final score (110) and to produce as output a prediction or some other instruction. The prediction tool (128), for example, may be a chatbot. Thus, for example, the chatbot could use the final score (110) to determine a predicted semantic meaning of the vector (104) (the data for which was previously provided by a user of the chatbot). Based on the predicted semantic meaning, the chatbot could be programmed to display a response to a user. For example, if the input was "My Program Froze, Help!" the chatbot might respond, "Try using the task manager to force the program to close."

In certain embodiments, the prediction tool (128) may be a movie prediction engine. Thus, for example, the prediction tool (128) may use the final score (110) to determine a suggested movie for a user to watch based on a vector (104) that reflects prior movies watched by the user.

The system shown in FIG. 1 may include additional components. For example, the system shown in FIG. 1 may also include a server (130). The server (130) is one or more computers, possibly in a distributed computing environment, such as the examples shown in and described with respect to FIG. 6A and FIG. 6B. The server (130) may be programmed to execute a number of applications, including a training application (132), one or more server applications, such as server application (134), and a response application (136).

The training application (132) is a set of programs on the server (130) that trains the machine learning models (e.g., the phrase recognition model (102) and the second machine learning model (120)) used by the server application (134). The machine learning models may be trained with sets of ngrams that have known semantic meanings. Note that two or more of the machine learning models may be treated as a larger set of models trained by the training application (132). Thus, for example, both the skip word scalar engine (118) and the phrase recognition model (102), and possibly also the second machine learning model (120), may be trained together.

The server application (134) may be one of several software programs executed by the server (130) as part of determining the semantic meaning of the vector (104). In an embodiment, the server application (134) may be any of the phrase recognition model (102), the skip word scalar engine (118), the combination engine (126), or a combination thereof.

The response application (136) may be one of several software applications (or computer programs) executed by the server (130), though with functions different than the server application (134). The server application (134) may be used to take some action with respect to the output of the server application (134). For example, the server application (134) could be the prediction tool (128), as described above. The server application (134) may be programmed to take some other computer action. The computer action may be to transmit a chatbot response, to suggest a movie to watch, to provide help for a software program, to modify a software program, to take a physical action with respect to the computer (e.g., shut the computer down, turn on a cooling system, etc.), to activate or deactivate a software application, to transmit data, some another action.

The system shown in FIG. 1 may also include a network (138). The network (138) may be the network (620) shown in and described with respect to FIG. 6. The network (138) may allow communication between a variety of different components, such as the data repository (100), the server (130), a developer device (140), and a user device (142).

Figure 6A:
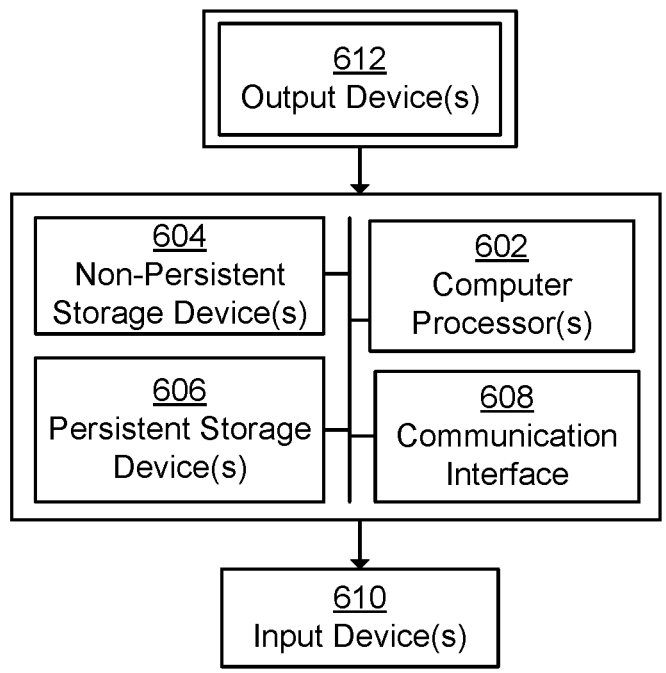
FIG. 6A and FIG. 6B show a computing system, in accordance with one or more embodiments.
Figure 6B:
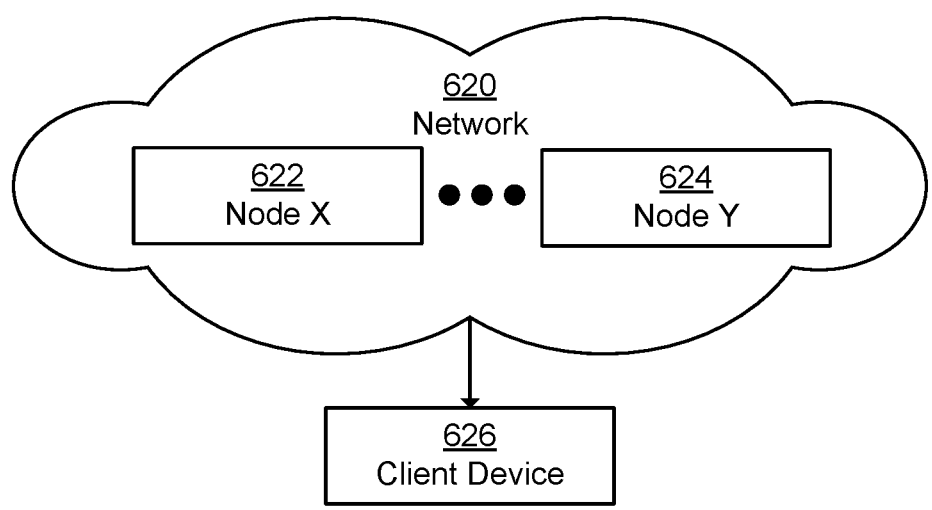

The developer device (140) is a computer, and may be one of the nodes (622) and (624) shown in and described with respect to FIG. 6A and FIG. 6B. The developer device (140) may be used by a developer or other software engineer or technician in developing and maintaining the training application (132) and the server application (134). The developer may use a developer application (144) as part of developing and maintaining the training application (132) and the server application (134). The developer application (144) may be a software application (or computer program), such as a web browser, or some application specific program.

The user device (142) may be one the nodes (622) and (624) shown in and described with respect to FIG. 6A and FIG. 6B. The user device (142) may include a user application (146) for accessing the server application (134). The user application (146) may include a graphical user interface for interacting with the response application (136) in the manner described above or described with respect to FIG. 4. For example, the user application (146) could be a web browser or application specific software.

The developer application (144) and the user application (146) may be a web browser that access the training application (132), the server application (134), and/or the response application (136) using web pages hosted by the server (130). In an embodiment, the developer application (144) and the user application (146) may be web services that communicate with any the server application (134), or the response application (136) using a representational state transfer application programming interface (RESTful API). Although FIG. 1 shows a client-server architecture, all or part of server application (134) may be a local application on the user device (142) without departing from the scope of the one or more embodiments.

Figure 2:
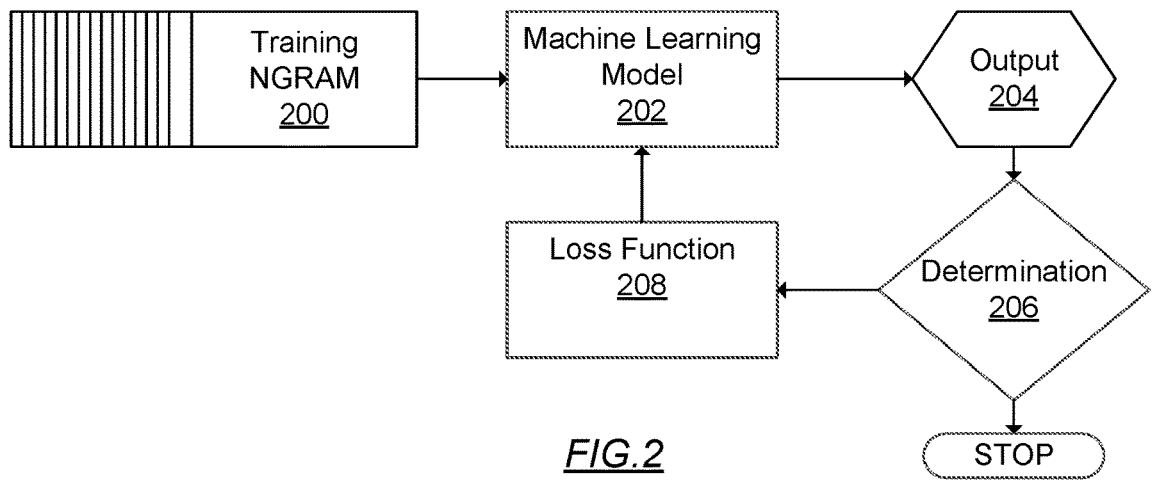
FIG. 2 shows an example of the training application shown in FIG. 1, in accordance with one or more embodiments.

FIG. 2 shows an example of the training application (132) shown in FIG. 1, in accordance with one or more embodiments. Again, the training application (132) is used to train one or more of the machine learning models used herein.

In an example, many training ngrams, including training ngram (200), are provided in the form of one or more vector inputs to a machine learning model (202). The machine learning model (202) may be any of the machine learning models described and shown with respect to FIG. 1, such as the phrase recognition model (102) or the second machine learning model (120).

The machine learning model (202) produces an output (204). The output (204) may be a prediction of the semantic meaning of the training ngram (200), for example. At this point, a determination (206) is made whether to end the training process. The determination (206) may be made by a developer observing the output (204) and determining whether the output (204) is sufficiently close to a known expected output that should result, if the machine learning model (202) had been ideal. A rule-based process, or even another machine learning model, may be used to make the determination (206).

If the training is not deemed satisfactory, then a loss function (208) is applied to the machine learning model (202). In mathematical optimization and decision theory, a loss function or cost function is a function that maps an event or values of one or more variables onto a real number intuitively representing some "cost" associated with the event. An optimization problem seeks to minimize a loss function. Stated differently, the loss function (208) seeks to optimize the machine learning model (202).

In the case of a CNN, the loss function may adjust the weights between nodes of the neural network so that the training ngram (200) results in a revised output (204) that matches or more closely matches the known result that should have been produced by an ideal machine learning model (202). Again, the known result is the result that the developer knows, ahead of time, should have been the answer produced by the machine learning model (202) as the output (204).

The training ngram (200), or perhaps a new set of data, may then be applied to the modified machine learning model (202). Again, the output (204) is examined and a determination (206) is made whether the result is satisfactory. A result is satisfactory if the result converges on the known result to a mathematically pre-determined, or to a degree determined by a developer. Once the determination (206) is satisfactory, training stops and the machine learning model (202) is considered ready for use with respect to inputs for which the output result is not already known.

The process described with respect to FIG. 2 is known as "training" the machine learning model (202). However, training need not only include the process shown in FIG. 2. For example, in some embodiments, an entirely different machine learning model may be selected for use as the machine learning model (202). Thus, for example, if a CNN is not producing a desired output (204), then the CNN could be replaced with a deep learning model and the process continued. In any case, the process of modifying or replacing the machine learning model (202) continues until convergence or until a developer decides to stop the training process.

Figure 3:
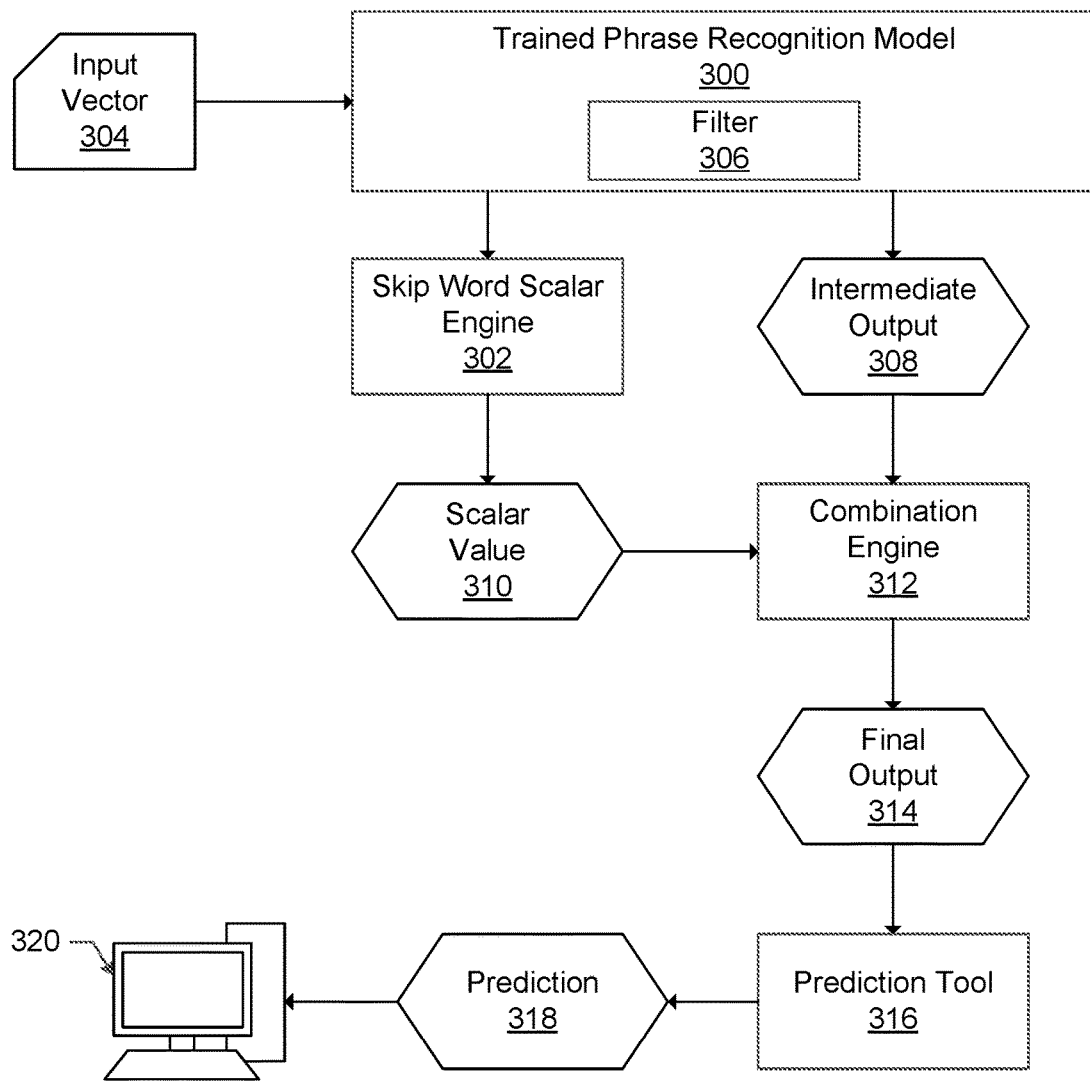
FIG. 3 shows an example of a possible implementation of the server application shown in FIG. 1, in accordance with one or more embodiments.

FIG. 3 shows an example of a possible implementation of the server application (134) shown in FIG. 1, in accordance with one or more embodiments. FIG. 3 shows a summary of a sample use case. Additional details regarding the operation of the trained phrase recognition module (300), the skip word scalar engine (302), and the combination engine (312) are shown in and described with respect to FIG. 4.

The server application may include a trained phrase recognition module (300) (e.g., the phrase recognition model (102) in FIG. 1). The implementation shown in FIG. 3 assumes that the skip word scalar engine (302) is different than the trained phrase recognition module (300), though in another implementation the skip word scalar engine (302) may be part of the trained phrase recognition module (300).

In use, an input vector (304) is provided as input to the trained phrase recognition module (300). In this example, the trained phrase recognition module (300) is a CNN. The CNN has been provided with a filter (306), which in this example has a skip word setting.

The trained phrase recognition module (300) applies the filter (306) and determines a match between the input vector (304) and the filter (306). As a result of the match, the trained phrase recognition module (300) produces an intermediate output (308).

In applying the filter (306), the trained phrase recognition model (300) skips at least one ngram. The at least one ngram is provided to the skip word scalar engine (302). The skip word scalar engine (302) produces a scalar value (310) which represents a semantic meaning modifier to be applied to the intermediate output (308).

The intermediate output (308) and the scalar value (310) are provided to the combination engine (312). The combination engine (312) combines the intermediate output (308) and the scalar value (310) to produce the final output (314).

The final output (314) is provided to a prediction tool (316). In turn, the prediction tool (316) produces a prediction (318). The prediction (318) is provided to a user device (320) for consumption or review by the user.

While FIG. 2, FIG. 3, and FIG. 4 show a configuration of components, other configurations may be used without departing from the scope of the invention. For example, various components may be combined to create a single component. As another example, the functionality performed by a single component may be performed by two or more components.

FIG. 4 shows a method for using an improved, semantically aware convolutional neural network, in accordance with one or more embodiments. The process shown in FIG. 4 is performed by a computer, such as shown in and described with respect to FIG. 6A and FIG. 6B, or by the systems shown in FIG. 1, FIG. 2, and FIG. 3.

At step 400, a vector having ngrams of text is input into a phrase recognition model. As indicated above, the phrase recognition model may be a neural network and may specifically be a convolutional neural network or a collaborative filtering convolutional neural network. The vector may be generated by taking, as input, a phrase provided by a user and then converting the phrase into a one dimensional array of data. The one dimensional array may include each of the ngrams.

At step 402, a filter is applied to the ngrams. The filter has a skip word setting of at least one. The filter may be applied by the phrase recognition model sliding the filter on all consecutive ngrams in the input vector and computing a score for each combination of ngrams. In this manner, the CNN checks all possible combinations of the ngrams in the input vector while keeping the same ordering of the ngrams.

At step 404, a determination is made regarding at least one ngram in the vector that is to be skipped. In this manner, at least one skip word is found.

Attention is first turned to how a skip word setting influences determination of the skip word. In particular, a non-zero skip word setting does not require that ngrams be skipped; rather, a non-zero skip word setting specifies the maximum number of ngrams that may be skipped.

For example, assume the skip word setting is "3" for a particular filter. Further assume that a single filter is used, the single filter being "I Love Gone Solar Wind," which is a series of five ngrams. If the vector was exactly "I Love Gone Solar Wind," then the CNN, when applying the filter with a skip word setting of "3," would find a match between the input vector and the filter. Stated differently, no ngrams from the input vector were actually skipped when identifying the match, despite a skip word setting of 3.

In another example, assume again the same filter and the same value of 3 for the skip word setting. However, now the user input is "I Really Love Gone With The Solar Wind." In this case, the skip word determination engine would still find a match between the vector and the filter. The reason for the match is that the skip word determination engine is programmed to find all possible combinations of the ngrams in the vector, while maintaining the same order of ngrams. One of those combinations is "I Love Gone Solar Wind," which matches the filter. However, to identify this match, the skip word determination engine had to skip the ngrams "Really," "With," and "The." In this example, these three ngrams are the selected skip words.

In a third example, assume again the same filter and the same value of 3 for the skip word setting. However, now the vector is "I Really Do Not Love Gone With The Solar Wind." In this case, the CNN would have had to have skipped four ngrams in order to identify a match between the input and the filter. Stated differently, there is no combination of the ngrams in the vector, while maintaining the order of the ngrams, where an exact match occurs between the vector and the filter when only 3 ngrams can be skipped. Thus, because the skip word setting is only "3", not "4," the input vector does not match the filter. For this reason, no skip words are determined, as there is no match in the first place.

Attention is now turned to at least two different methods for determining the skip word. In an embodiment, the phrase recognition model may compute a score for a window by computing the inner product between the filter and the representation of the ngrams in a window. Then, max pooling over time may be applied, which means that the window with the highest score is returned as the selected skip word or selected skip words. In another embodiment, dynamic programming may be used to determine the at least one skip word. First, a dynamic table is generated. The dynamic table may be a three dimensional tensor, "S". A tensor, mathematically, can be conceived as an array of possibly multiple arrays of numbers. In this case, S is defined by an outer array composed of a middle array, which in turn is composed of an inner array of numbers. The three arrays may have different sizes; in other words, an outer array could be a matrix having fewer entries than the matrices that form the middle or inner arrays.

The outer array of S has an entry for each slot in S. A slot is one of the possible ngrams in the filter. The outer array has dimensions at least equal to the size of the filter. In the example from above, where the filter is four words, the "S" will have an outer array of size 4. The size of the middle array of S is the skip word setting, plus one. One is added for the case where no word was skipped. The innermost array has a size equal to the number of ngrams in the input vector. Thus, if the input vector is "I Love Gone With The Solar Wind," then the innermost array has a size of 7 (i.e., is at least a one by seven matrix).

Entry $S[i,j,k]$ holds the maximal value that can be achieved by considering the first i slots, with exactly j skipped words, and processing the first k ngrams in the input vector. The term $A[i,k]$ denotes the score given to slot i for ngram k in the input vector. In this case, the update rule for determining which ngrams will be the skip word(s) is: $S[i,j,k]=\max(A[i,k]+S[i-1,j,k-1], S[i, j-1, k-1])$. The first term indicates the case where the next ngram is not skipped, and therefore the score for the first term is considered. The second term indicates the case where the ngram is skipped and one is added to the number of skip words for the input vector. Once the update rule has been processed, all skip words are determined.

If the number of skip words exceeds the skip word setting, then the process of FIG. 4 terminates, because the input vector does not match the filter at the selected skip word setting. However, if the number of skip words is equal to or less than the skip word setting, then the method of FIG. 4 continues.

Specifically, at step 406, the phrase recognition model may output an intermediate score for a set of ngrams, within the ngrams in the input vector, that match the filter. The intermediate score, again, represents an estimation of how closely the input vector matches the known semantic meaning of the filter.

A score may be determined for each slot in the input vector (i.e., each ngram in the input vector receives a matching score relative to the filter). The scores represent the degree of matching. For example, assume the input vector is "I really love this movie", and the filter is "I love this movie". In this case, the first word in the text will get a high score for the first slot of the filter. The second word in the text will get a low score of all of the slots in the filter because "really" is not close to any of the words captured by the filter, and so on. The scores may be combined in order to generate the intermediate score.

Returning to FIG. 4, at step 408 a scalar number is calculated to represent a semantic meaning of the at least one skip word. Calculating the scalar number may include inputting the at least one skip word into a skip word scalar engine, and outputting, by the skip word scalar engine, the semantic meaning of the at least one skip word.

In one embodiment, in order to consider the skipped words, the phrase recognition model may translate the ngram embedding into a scalar that represents the magnitude of each skip word. If the skipped word is "really", then the intermediate score will be increased. If the skipped words are the adjacent words "kind of," then the intermediate score can be decreased. If the skip word is "don't" or "do not," then the intermediate score can be even negative or even inverted.

Some skip words may be assigned a value of zero. Stated differently, a skip word assigned a scalar number of zero has no additional semantic meaning, and is thereby discarded. For example, assume again that the input vector is "I Really Love Gone With The Solar Wind," and the filter is "I Love Gone Solar Wind." Then, the ngram "really" is a skip word that is determined to have a positive number, thereby indicating a reinforcement of the semantic meaning of the filter. However, the ngrams "With" and "The" are skip words that, in this example, have no semantic meaning as they are determined to be connecting words assumed in the semantic meaning of the filter.

Multiple different skip words may be assigned multiple different scalar numbers. However, the scalar numbers are ultimately combined into a single scalar number which is output by the skip word scalar engine.

In the embodiment where the phrase recognition model implements the skip word scalar engine, stacked fully connected layers in the phrase recognition model may be used to compute the scaler numbers. However, other techniques may also be used to calculate the scalar number.

Another embodiment for determining the scalar number is to pass consecutive skipped words into a second machine learning model, such as a recurrent neural network (RNN), in communication with the phrase recognition model. An example may serve to demonstrate how an RNN could operate to calculate the scalar number.

Consider the sentence, "he's not too nice". Assume that the CNN filter applied to this sentence is "he's nice" and that the skip word setting is two. Thus, in this example, the words "not" and "too" are skip words and are skipped by the CNN when comparing the sentence to the filter.

A word level skip word scalar engine might miss the semantic meaning of the combined bigram "not too." Therefore, an RNN may be used to support this linguistic aspect. The RNN may be fed with the distributed representations of the skipped words (in this case, two vectors, that represent "not" and "too"), and the output of the RNN is a scalar. For instance, if only the word "not" is fed to the RNN, then the RNN may output a negative score, because the word "not" is a negation word that flips the meaning of the captured phrase. However, if both "not" and "too" are fed to the RNN, then the RNN may output a positive score between 0 to 1, because the phrase "not too" acts as a down toner, rather than as a negation.

Yet another embodiment for determine the scalar number is to use a set of rules that map a particular skip word to a number. Additional rules determine how multiple scalars for multiple skip words are combined into the skip word scalar number.

Returning to FIG. 4, at step 410 the scalar number is applied to the intermediate score to generate a final score for the set of ngrams. The scalar number may be applied to the intermediate score using one or more of a number of different mathematical operations. For example, the scalar can be added to or subtracted from the intermediate score. In another example, the scalar number can be multiplied with or divided by or from the intermediate score. In yet another example, the scalar number may represent an inversion of the intermediate score, such as by multiplying the intermediate score by a negative number. In any case, the final score is produced. Again, the final score represents an overall estimation of the semantic meaning of the original input vector. Optionally, the final score may be stored in a data repository and the method of FIG. 4 may complete.

Otherwise, at step 412, a computer action may be performed using the final score. The computer action taken is based on the estimated semantic meaning (i.e., the final score) of the input vector. For example, the computer action may be to predict, based on the final score, a product of interest to a user. Then, the computer action may also include transmitting an advertisement for the product to a user device of the user. For example, if the input vector had been "I Really Love The Game Fun With Gizmos," then the final score assigned to the input vector may indicate a strong like for the game. Rules may then associate the game "Fun With Gizmos" with other games, such as "Fun With Vectors." The computer could then transmit an advertisement for the game "Fun With Vectors," along with a suggestion to the user that because the user loved "Fun With Gizmos," they will also love "Fun With Vectors."

In another example, the user could have entered a query into a chatbot. Then rules or another machine learning model could be used to predict, predicting, based on the final score, an answer to the query. The answer is a computer action. The computer action could then transmit the answer to a user device as part of the computer action, or as another computer action.

The various operations described with respect to FIG. 4 may be varied, and may include additional operations. For example, the method of FIG. 4 may also include training the phrase recognition model. In a more specific example, assume the phrase recognition model is a neutral network.

In this case, training the neural network may include receiving training phrases for which corresponding known meanings are available. An output of the training phrases is predicted. The output is compared to a loss function based on the corresponding known meanings to produce an intermediate output. The neural network is modified using the intermediate output. Receiving, predicting, comparing, and modifying are repeated until convergence.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 5:
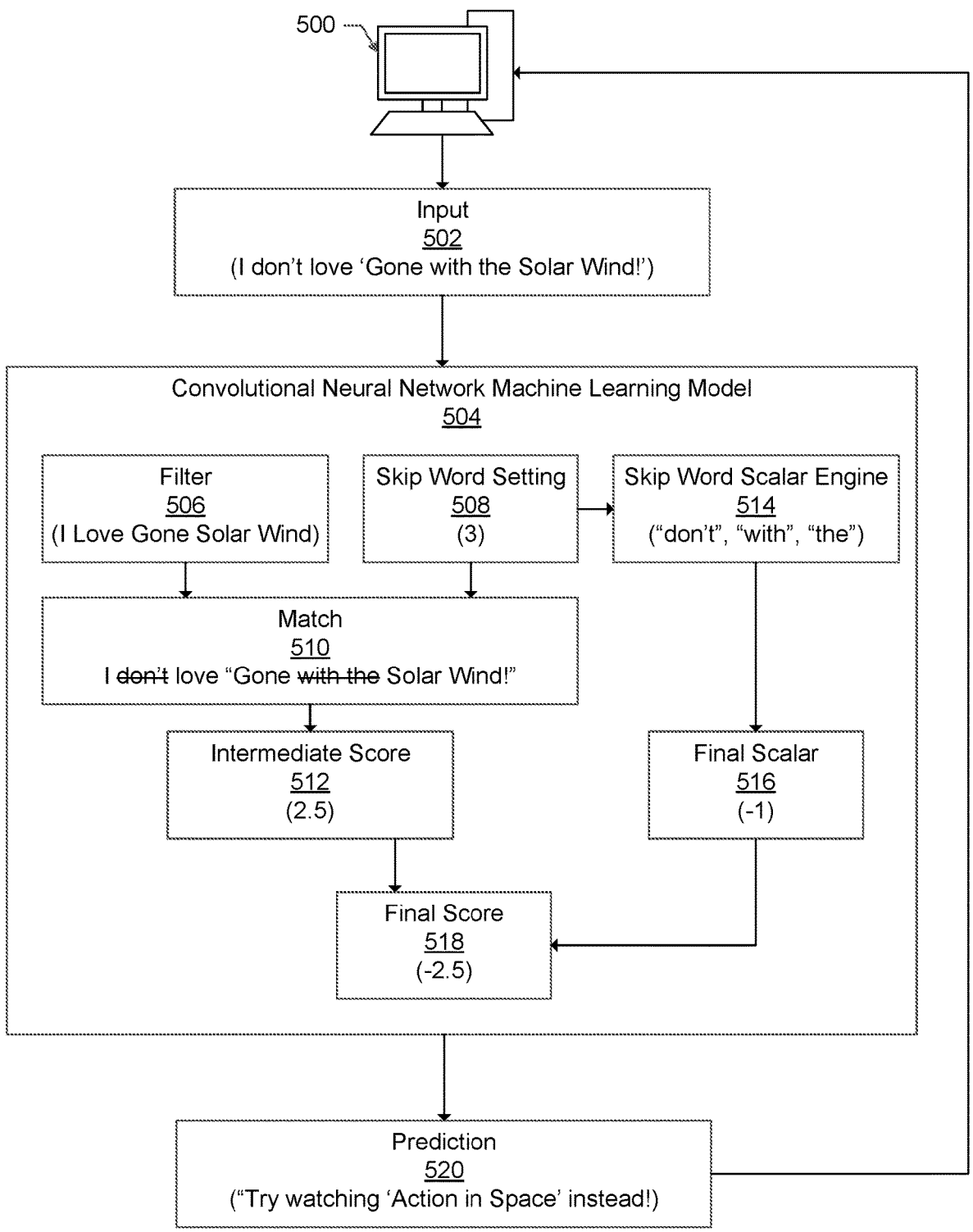
FIG. 5 shows an example, in accordance with one or more embodiments.

FIG. 5 shows an example, in accordance with one or more embodiments. The following example is for explanatory purposes only and not necessarily intended to limit the scope of the claimed inventions. The example shown in FIG. 5 may be implemented using the systems shown in FIG. 1, FIG. 2, and FIG. 3 and using the techniques described with respect to FIG. 4.

Initially, a user provides an input (502) to a user device (500). The input (502) is the phrase, "I don't love 'Gone with the Solar Wind'!" In this example, "Gone with the Solar Wind" is a movie. The user has entered this phrase into a Web browser which displays information related to movies. The user hopes to use a computer find different kinds of movies to watch, because the user did not enjoy watching "Gone with the Solar Wind."

The user device (500) transmits the input phrase over a network to a server executing a convolutional neural network machine learning model (504). In this example, one of the filters used by the convolutional neural network machine learning model (504) is filter (506). The filter has fives slots: "I Love Gone Solar Wind." Additionally, the convolutional neural network machine learning model (504) has a skip word setting (508). The skip word setting (508) is 3, in this example.

The convolutional neural network machine learning model (504) determines a match (510) between the filter (506) and the input (502). As can be seen in FIG. 5, the match indicates the presence of three skip words. The three skip word are "don't", "with", and "the". Because the match (510) exists between the filter (506) and the input (502), taking into account the skip word setting (508), the convolutional neural network machine learning model (504) computes an intermediate score (512) for the input (502). The intermediate score (512) indicates a first estimate of the degree of match between the semantic meaning of the input (502) and the known semantic meaning of the filter (506). In this example, the value of the match (510) is "2.5", which in this example indicates a strong correlation in semantic meaning between the input (502) and the filter (506).

In other words, if the process were to end here, the convolutional neural network machine learning model (504) would have predicted the opposite of what the user intended. The convolutional neural network machine learning model (504) would have predicted the user loved watching "Gone with the Solar Wind." This result may be considered undesirable, because the ultimate prediction returned to the user may be movies similar to "Gone with the Solar Wind," which the user would reject. The user would then be discouraged or frustrated, and possibly may abandon a paid movie service thinking the movie service offered no movies of interest to the user.

However, using the one or more embodiments described above with respect to FIG. 1, FIG. 2, FIG. 3, and FIG. 4, a skip word scalar engine (514) may be used by the computer to automatically determine how the skip words impact the semantic meaning of the input (502). In particular, the skip word scalar engine (514) determines a scalar value that can be applied to the intermediate score (512) to generate a more accurate prediction of the semantic similarity between the input (502) and the filter (506).

In this example, the words "with" and "the" are determined to have little or no semantic impact, as it is already known from the development of the filter that "with" and "the" are filler words and that the words of interest are "gone", "solar", and "wind". Thus, the words "with" and "the" are assigned scalar values of zero. However, the word "don't" is computed as representing an inversion of semantic meaning, to at least some degree. Thus, the scalar value of "don't" is assigned to be "−1". The scalar values of "4", "0", and "0" for the three skip words are combined and the final scalar (516) is the number "−1".

The final scalar (516) is then combined with the intermediate score (512) to generate the final score (518). In this case, the intermediate score (512) is multiplied by the final scalar (516). Thus, the final score (518) is 2.5 times −1, which is −2.5. Thus, instead of representing a strong match in semantic meaning between the input (502) and the filter (506), instead the final score (518) more accurately reflects the user's intended original meaning of not loving the movie. As a result, the convolutional neural network machine learning model (504) has more accurately predicted the semantic intent of the input (502) from the user.

The more accurate prediction of the user's intent, represented by the final score (518), may then be used to generate a prediction (520) or other computer action. In this case, additional rules may compare the fact that the user did not love the movie "Gone with the Solar Wind." The rules may, for example, determine that the user does not like dramas. The rules may specify that users that do not like dramas may be more interested in action movies. Thus, the prediction (520) may be a Human-readable recommendation, such as "Try watching 'Action in Space' instead!" The prediction (520) is then returned to the user device (500) for the consideration of the user.

In addition to the above example shown in FIG. 5, one or more embodiments above have been implemented for a collaborative filtering convolutional neural network. In particular, the techniques described above were applied to online reviews of products.

An improved accuracy was found when comparing to an existing CNN with a selected skip word setting versus using a CNN together with a skip word scalar engine. For the CNN used with the one or more embodiments, fewer filter were needed, which improves interpretability of the predictions. An automatically obtained list of amplifiers (scalar values above one which increased the predicted semantic match between the input and the filter) and downtoners (scalar values below one which decreased the predicted semantic match between the input and the filter) were produced. For example, the following list of words and their associated magnitude learned scalers were found: "kinda": 0.9643235; "roughly": 0.81323618; "amazing": 1.09698151; "extremely": 1.12726411; "really": 1.20539969; and "not" 0.16866904. As can be seen, amplifier ngrams received scores greater than one, which means the skip word increased the value of the filter. Downtoner ngrams received scores less than one, which means the skip word reduced the value of the filter.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving a plurality of training phrases for which corresponding known meanings are available;
   predicting an output of the plurality of training phrases;
   comparing the output to a loss function based on the corresponding known meanings to produce an intermediate output;
   modifying the phrase recognition model using the intermediate output;
   repeating receiving the plurality of training phrases, predicting the output, comparing the output to the loss function, and modifying the phrase recognition model until convergence and a trained phrase recognition model is generated;
   inputting, into the trained phrase recognition model comprising a neural network, a vector comprising a plurality of ngrams of text, wherein the neural network contains a filter comprising a skip word setting of at least one;
   applying, using the trained phrase recognition model, the filter to the plurality of ngrams during execution of the neural network;
   determining, based on the skip word setting, at least one ngram in the vector to be skipped to form at least one skip word;
   outputting, by the neural network, an intermediate score for a set of ngrams of the plurality of ngrams that match the filter;
   calculating a scalar number representing a semantic meaning of the at least one skip word;
   generating based on the scalar number and the intermediate score, a final score for the set of ngrams, wherein the final score represents an estimated semantic meaning of the vector; and
   performing, automatically, a computer action based on the estimated semantic meaning using the final score.

2. The method of claim 1, further comprising, before inputting, modifying, before inputting, the neural network by:
   defining the filter; and
   setting the skip word setting.

3. The method of claim 1, wherein calculating the scalar number comprises:
   inputting the at least one skip word into a skip word scalar engine, and
   outputting, using the skip word scalar engine, the semantic meaning of the at least one skip word.

4. The method of claim 1, wherein calculating the scalar number comprises assigning, using a rule, a value to the at least one skip word.

5. The method of claim 1,
   wherein the plurality of ngrams are extracted from a query submitted by a user over a network, and
   wherein performing the computer action comprises:
      predicting, based on the final score, an answer to the query, and
      transmitting the answer to a user device of the user.

6. The method of claim 5, wherein the computer action comprises:
   predicting, based on the final score, a product of interest to the user, and
   transmitting an advertisement for the product to a user device of the user.

7. The method of claim 1, wherein determining the at least one skip word comprises using dynamic programming to determine which of the plurality of ngrams compose the at least one skip word.

8. The method of 7, wherein:
   using the dynamic programming to determine which of the plurality of ngrams compose the at least one skip word comprises building a tensor, "S", having an outer array, a middle array, and an inner array,
   the outer array comprises a corresponding entry for each ngram in the plurality of ngrams,
   the middle array comprises a number of allowed skipped words, plus one, and
   the inner array has a length corresponding to an input text.

9. A system comprising:
   a data repository storing:
      a phrase recognition model comprising a convolutional neural network machine learning model,
      a vector, comprising a plurality of ngrams of text, configured for input into the phrase recognition model,
      a filter contained by the convolutional neural network, the filter comprising a skip word setting for the at least one filter, wherein the skip word setting defines how many words the convolutional neural network may skip when comparing the vector to the at least one filter;
      at least one skip word skipped by the convolutional neural network when comparing the vector to the filter,
      an intermediate score for a set of matching ngrams in the plurality of ngrams, the intermediate score indicating a first prediction of a match between the vector and filter,
      a skip word scalar engine;
      a scalar number representing a semantic meaning of the skip word, and
      a final score for the set of matching ngrams, wherein the final score represents an estimated semantic meaning of the vector; and
   a server configured to execute a server application and a response application, wherein the server application comprises:
      instructions for executing the phrase recognition model by:
         applying the filter with the skip word to the plurality of ngrams during execution,
         determining at least one ngram in the vector to be skipped to form the at least one skip word, and
         outputting the intermediate score for the set of matching ngrams;
      instructions for executing the skip word scalar engine to compute the scalar number;

a combination engine configured to combine the intermediate score and the scalar number to produce the final score; and a prediction tool configured to predict a predicted computer action based on the estimated semantic meaning using the final score, wherein the response application is configured to perform the predicted computer action, based on the estimated semantic meaning, over a network with respect to a user device.

10. The system of claim 9, further comprising:

a skip word determination engine configured to automatically determine which of the plurality of ngrams in the vector are the at least one skip word.

11. The system of claim 10, wherein the skip word determination engine comprises the phrase recognition model.

12. The system of claim 9, wherein the skip word determination engine is configured to use dynamic programming during execution of the phrase recognition model to determine at least one ngram in the vector which is be skipped when the filter is applied to the vector.

13. The system of claim 9, wherein the server is further configured to execute a training application configured to train the phrase recognition model to produce the intermediate score.

14. The system of claim 9, wherein the skip word scalar engine is selected from the group consisting of the phrase recognition model, a recurrent neural network separate from the phrase recognition model, and a set of rules.

15. The system of claim 9, wherein the phrase recognition model comprises a collaborative filtering convolutional neural network.

16. The system of claim 9, further comprising a training application configured to:

receive a plurality of training phrases for which corresponding known meanings are available;

predict an output of the plurality of training phrases;

compare the output to a loss function based on the corresponding known meanings to produce an intermediate output;

modify the phrase recognition model using the intermediate output; and repeat receiving the plurality of training phrases, predicting the output, comparing the output to the loss function, and modifying the phrase recognition model until convergence.

17. A method of training a phrase recognition model comprising a neural network having a filter comprising a skip word setting of at least one, the method comprising:

receiving a plurality of training phrases for which corresponding known semantic meanings are available;

converting the plurality of training phrases into a vector comprising a plurality of ngrams of text;

inputting, into the phrase recognition model, the vector;

applying, using the phrase recognition model, the filter to the plurality of ngrams during execution of the neural network;

determining, based on the skip word setting, at least one ngram in the vector to be skipped to form at least one skip word;

outputting, by the neural network, an intermediate score for a set of ngrams of the plurality of ngrams that match the filter;

calculating a scalar number representing a semantic meaning of the at least one skip word;

generating based on the scalar number and the intermediate score, a final score for the set of ngrams, wherein the final score represents an estimated semantic meaning of the at least one skip word; and comparing the estimated semantic meaning to the known semantic meanings to form a comparison; and modifying the phrase recognition model based on the comparison between the final score and the known semantic meanings.

18. The method of 17, wherein comparing the final score to the known semantic meanings comprises comparing the final score to a loss function based on the corresponding known semantic meanings.

19. The method of claim 17, further comprising:

repeating receiving the plurality of training phrases, inputting the vector, applying the filter, determining the at least one ngram, outputting the intermediate score, calculating the scalar number, generating the final score, comparing the final score to the known semantic meanings, and modifying the phrase recognition model, until convergence.

* * * * *